Dec. 27, 1966   R. E. FICKES   3,294,519
GLASS SHEET TEMPERING APPARATUS
Filed Aug. 1, 1963   2 Sheets-Sheet 1
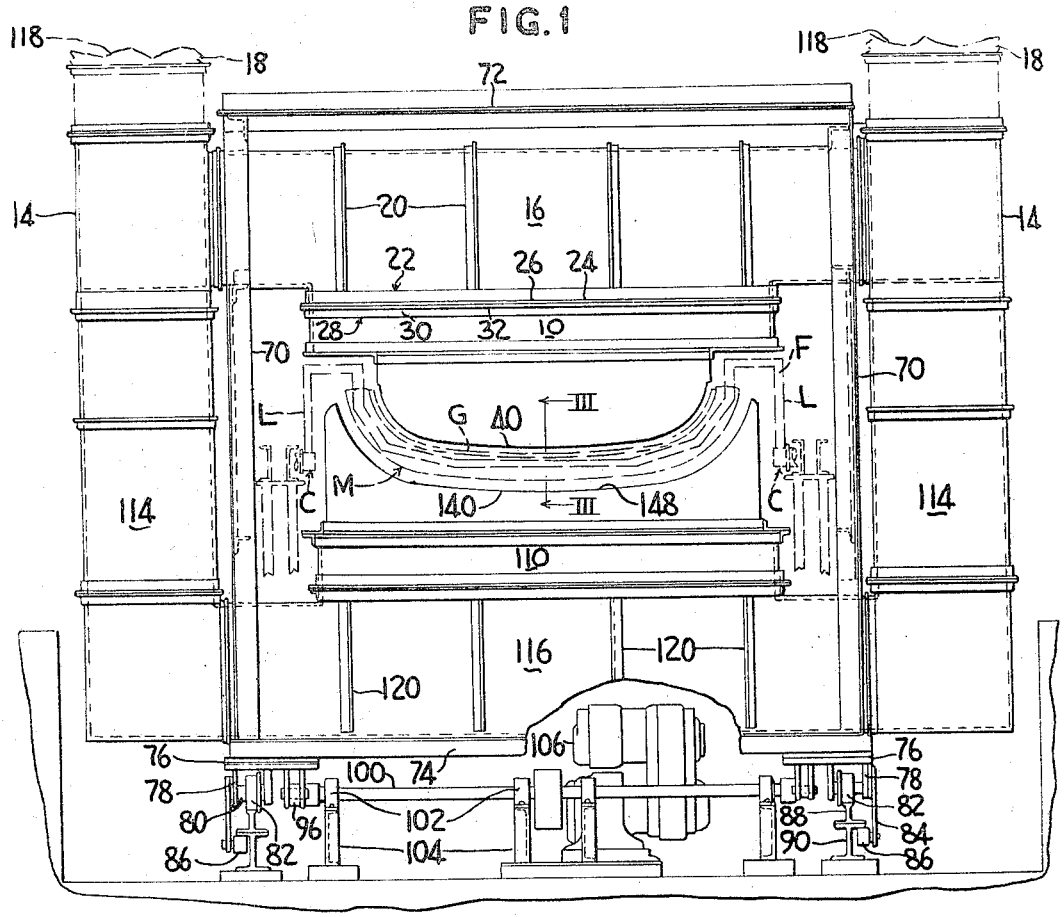
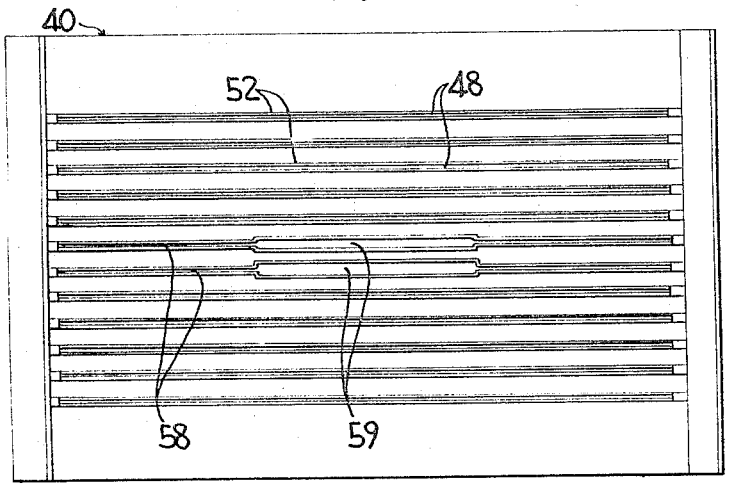
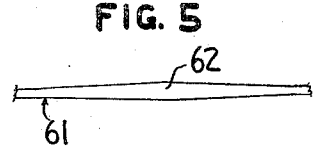
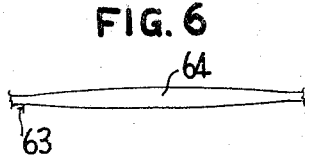
INVENTOR.
ROBERT E. FICKES
BY Oscar L. Spencer
ATTORNEY Dec. 27, 1966  R. E. FICKES  3,294,519
GLASS SHEET TEMPERING APPARATUS
Filed Aug. 1, 1963  2 Sheets-Sheet 2

INVENTOR.
ROBERT E. FICKES
BY
Oscar L. Spencer
ATTORNEY

United States Patent Office 3,294,519
Patented Dec. 27, 1966

3,294,519
GLASS SHEET TEMPERING APPARATUS
Robert E. Fickes, Manor Township, Pa., assignor to Pittsburgh Plate Glass Company, Pittsburgh, Pa., a corporation of Pennsylvania
Filed Aug. 1, 1963, Ser. No. 299,213
4 Claims. (Cl. 65—348)

This application relates to glass sheet tempering apparatus and particularly concerns apparatus for tempering relatively large glass sheets, especially those that are shaped prior to being tempered by quenching.

The basic process of tempering glass sheets is old and described in prior patents. Such process comprises heating a glass sheet above its annealing range and then rapidly cooling the surfaces of the glass sheet to set the latter while the center is still hot. This action results in the sheet having its surfaces stressed in compression and its intermediate portion stressed in tension.

The surface stressed in compression makes the sheet much stronger than untempered glass because glass is much more able to withstand external forces when it is stressed in compression than when it is stressed in tension. Moreover, when the outer surface or compression skin of the glass sheet is penetrated, the tension stresses locked up within the glass cause it to shatter into a large number of relatively harmless, smoothly surfaced pieces. In contrast, annealed glass is fractured more easily, and when fractured, breaks into relatively dangerous, large, jagged fragments. The uniformity of size of the shattered particles indicates the uniformity of temper of the glass. The smaller smoother particles of shattered tempered glass are much safer than the jagged fragments of untempered glass.

According to conventional operations, the glass is heated nearly to its softening point and then quickly quenched by uniformly exposing the opposite surfaces of the heated glass sheets to streams of a fluid, such as air, arranged to cool both surfaces uniformly and simultaneously. The fluid is disposed through two opposed, space nozzle boxes, each provided with a set of nozzles. Each set of nozzles faces a different surface of the glass sheet.

The prior art considered it a prerequisite to uniform tempering to have an even distribution of the cooling air on the glass surfaces. This is usually accomplished by blasting air through a plurality of identical, uniformly spaced, elongated nozzles forming apertured walls of the nozzle boxes. The nozzles are reciprocated transversely of their length through an amplitude sufficient to insure that each increment of the glass sheet area is swept by at least one of the reciprocating nozzles. The distance between the nozzle orifices and the adjacent sheet surfaces has beeen kept as uniform as possible in order to promote uniform quenching.

By reciprocating the nozzles relative to the surfaces of the glass sheet, and by applying the streams of air from a common source, the prior art apparatus provided substantially uniform tempering for flat glass and gently curved glass of relatively small and intermediate sizes. However, as automobile backlights became larger and more complicated in shape, it has become more and more difficult to temper glass sheets adequately. Therefore, it has become necessary to supply air or other tempering fluid at a greater rate of flow per unit area for larger sizes than for smaller sizes in order to insure that the glass is adequately tempered.

The present invention has discovered a more economical means for supplying sufficient air to adequately temper the entire surface of relatively large glass sheets as well as those to be bent relatively sharply compared to earlier patterns. According to the present invention, the apertured walls of the nozzzle boxes which face the opposite surfaces of the glass sheet are constructed in a different manner from those of the prior art in order to provide more uniform tempering without requiring the use of superfluous tempering fluid or air to insure that all areas of the glass sheet are tempered adequately.

According to the present invention, the wall of each nozzle box facing the central portion of a glass sheet undergoing quenching has a greater proportion per unit area apertured than the remainder of the wall facing the portion of the glass sheet surrounding its central portion. This construction causes a slight pressure gradient in the tempering fluid from the central region to the outermost regions of the space within which the glass sheet is supported for tempering and results in a continuous outward flow from the center to the margin of the glass sheet and helps remove air from the vicinity of the glass sheet surface after the relatively cool air supplied through the apertured walls has contacted the heated glass surface to chill the latter and has in turn been heated by said contact.

A single source of tempering fluid under pressure is provided with the novel construction of the apertured walls. This minimizes the problems of controlling the pressures of air furnished by different blowers and reduces maintenance problems considerably. Sufficiently adequate uniform tempering has been provided for present commercial backlights merely by increasing the width of the intermediate nozzles only in their central portion to increase the percentage of apertured portion facing the central area of the glass compared to other portions.

The invention will be better understood after an illustrative embodiment is described. In the drawings which form part of the description and wherein like reference numerals refer to like structural elements, FIG. 1 is an end elevation of a typical tempering apparatus provided with elongated slot nozzles for which the present invention is adapted;

Figure 7:
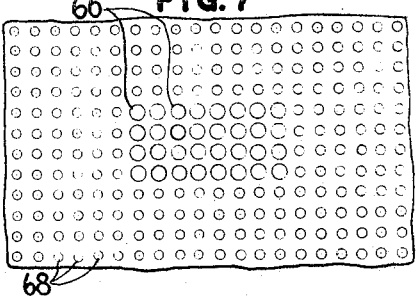
Figure 3:
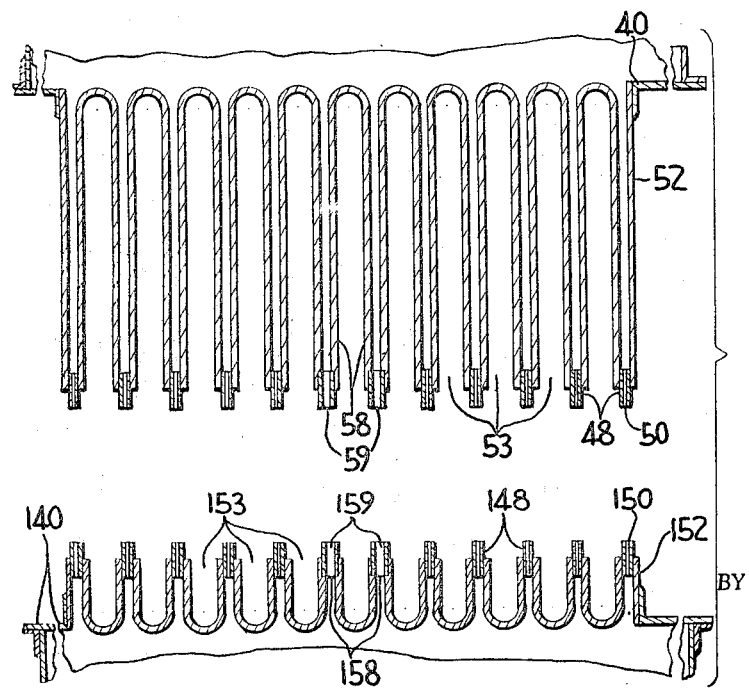
FIG. 3 is a sectional view across the longitudinal center of the nozzles of upper and lower nozzle boxes taken along the line III—III of FIG. 1 depicting how the centrally disposed nozzles are constructed according to the present invention.

FIG. 4 is a schematic view of a set of nozzles showing how the central portion of the centrally disposed elongated slot nozzles is modified according to an inexpensive embodiment of the present invention; and FIGS. 5 and 6 are schematic views disclosing typical alternative aperture configurations for the centrally disposed elongated slot nozzles; and FIG. 7 is a schematic view showing how orbitally moved nozzles of circular cross-section are modified according to still another embodiment of the present invention.

Referring to the drawings, tempering apparatus for which the present invention is especially adapted comprises a source of pressurized air or blowing means (not shown) communicating to an upper air box 10 through vertical conduits 14 and a lower air box 110 through additional vertical conduits 114. The vertical conduits 14 supply air under pressure to an upper header 16 which communicates with the upper air box 10, while the additional vertical conduits 114 supply air under pressure to a lower header 116 communicating with the lower air box 110. Flexible connections 18 and 118 interconnect each conduit to the source of pressurized air.

Metal angle iron reinforcements 20 encompass the upper header 16 to reinforce the latter. Similar reinforcements 120 encompass the lower header 116 for the same purpose. The bottom of the header 16 is reinforced with horizontal angle irons 22. Each of the latter has a vertical ledge 24 reinforcing the header and a horizontal ledge 26 extending outwardly from the bottom of the vertical ledge 24. Additional horizontal angle irons 28 reinforce the upper air box 10. Each additional angle iron 28 comprises a vertical ledge 30 reinforcing the upper air box 10 and a horizontal ledge 32 extending outwardly from the top of the vertical ledge 30. Horizontal ledges 26 and 32 are bolted together to secure upper air box 10 to upper header 16. The bottom of header 16 is open to permit free communication of air from the header 16 to the upper air box 10.

The lower air box 110 is a mirror image of the upper air box 10 and lower header 116 is a mirror image of upper header 16. Lower air box 110 is connected to header 116 in a manner similar to the connections between the upper air box 10 and header 16. The bottom of the upper air box 10 and the top of the bottom air box 110 are open to provide communication to the respective headers 16 and 116.

The upper air box 10 has a bottom wall 40. A plurality of parallel narrow slot nozzles 48 are arranged in parallel relation to one another and terminate in downwardly directed elongated orifices 50 which are curved to conform generally to the shape of the curved glass sheet to be tempered. Each elongated nozzle 48 extends the full length of the bottom wall 40 of the upper air box 10. Each individual nozzle 48 is spaced from its adjacent parallel elongated nozzle 48 by a distance substantially in excess of the width of the nozzle.

The lower nozzle box 110 is opposite and vertically spaced from the upper air box 10. The upper wall 140 of the lower air box 110 is provided with elongated nozzles 148 having curved orifices 150 opposing the orifices 50 of the elongated slot nozzles 48 formed through the bottom walls 40 of the upper air box 10.

The nozzles 48 are formed at the bottom of parallel vertical walls 52 which terminate in curved bottom edges that conform generally to the shape of the glass sheet being tempered. Each elongated slot nozzle 48 is attached to the lowermost extremity of a pair of walls 52. Each pair of vertical walls 52 supporting each nozzle 48 is spaced from its adjacent pair of walls supporting adjacent nozzles by a space considerably greater than the width of the elongated nozzles 48.

A typical example of nozzle construction employed successfully for tempering small or gently bent sheets has parallel, elongated slot nozzles having orifice ¼ inch wide. The nozzles are spaced from their neighbors by 6 inches center to center and are supplied with from about 300 to about 500 cubic feet per minute of air per foot length of nozzle, depending on the area and severity of the glass sheet to be tempered.

The upper wall 140 of the lower air box 110 is similarly apertured and is provided with a series of upwardly extending vertical walls 152 each supporting an elongated nozzle 148 at the uppermost end of the pair of nozzles. A series of parallel passages 153 of greater width than the space occupied by the parallel walls 152 extends between each pair of parallel walls 152.

The nozzle width, orifice curvature and spacing between nozzles is the same for the lower nozzles 148 as it is for the upper nozzles 48. Thus, a curved space is defined between the upper and lower nozzles. This curved space conforms to the shape of a curved glass sheet to be quenched. The parallel passages 53 and 153 provide wide paths for the escape of tempering fluid after the latter is dispensed through the nozzle orifices toward the opposite surfaces of the glass sheet to be tempered.

Each bent glass sheet G is supported on a typical sectionalized mold M carried by a support frame F which has upstanding legs L supported on a stub conveyor C. The mold is a typical sectionalized mold having sections pivoted to each other with each section provided with an upper shaping surface conforming to a portion of the shape desired for a curved glass sheet. The frame F is provided with vertical lges L that are interconnected to each other through cross members extending transversely between the bottom of the legs, and additional curved longitudinal frame members that interconnect the tops of the legs L to each other and substantially conform to the elevational shape of the mold M in the closed position. The construction of the mold M, support frame F, and legs L permits the curved glass sheet G and its supporting mold construction to be supported in the space between the upper air box 10 and the lower air box 110.

The upper and lower air boxes are interconnected to one another by means of a frame support. The latter comprises vertical angle iron support posts 70 that rigidly secure the upper and lower headers 16 and 116 to each other and are. further suitably interconnected to each other by upper horizontal beams 72 and 73 and lower horizontal beams 74 and 75.

The upper horizontal beams 72 and 73 form an upper horizontal frame, while the lower horizontal beams 74 and 75 form a lower horizontal frame. The support posts 70 interconnect the corners of the upper and lower horizontal frames to form the frame support. The construction of the frame support is such as to provide sufficient clearance for reciprocation of the frame support relative to the stub roll conveyor C and its supporting structure when the support frame and its interconnected air boxes and tempering nozzles are reciprocated while quenching a supported heat-softened glass sheet in a manner conventional in the art.

A bracket support plate 76 is attached to the lower surface of each horizontal lower beam at each end thereof. Each bracket support plate 76 supports an F-shaped member 78, the parallel legs of which extend downward to provide a bearing support for a stub axle 80 on which is mounted a flanged wheel 82. The outermost surface of the outer leg of the F-shaped member supports a downwardly extending lug 84. A roller 86 is pivotally mounted to the bottom of the lug 84. Each wheel 82 rides on a T-shaped rail 88 and each roller 86 is freely rotatable to engage the undersurface of the upper horizontal member of an I-beam which forms a track support structure 90.

Figure 2:
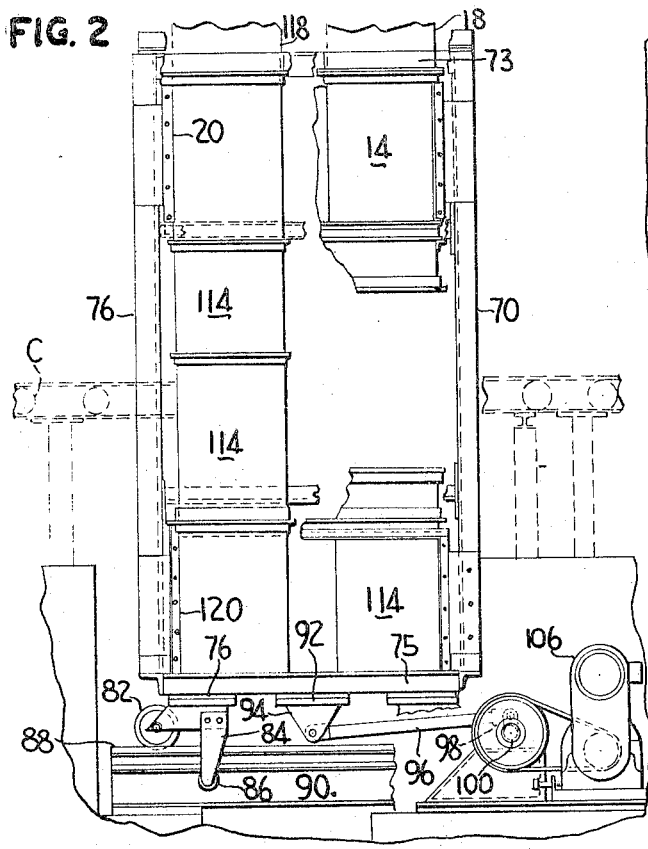
FIG. 2 is a view at right angles to the first view.

An additional horizontal plate 92 (FIG. 2) is attached to each horizontal lower beam 75 intermediate the bracket support plates 76. Each additional plate 92 supports a pair of parallel vertical plates that form a bearing bracket 94. Each bearing bracket 94, in turn, is pivotally supported to one end of a link 96 which interconnects the bearing bracket 94 with a crank arm 98. A crank arm 98 is attached to each opposite longitudinal extremity of a rotatable rod 100. The latter is rotatably supported by a plurality of bearing support brackets 102 supported on posts 104. Rotating rod 100 is actuated by a drive motor 106 through suitable belt drives and reduction gears.

A glass sheet is conveyed between the upper and lower air boxes 10 and 110 for quenching immediately after it has been shaped to the mold shaping surface and is still at an elevated temperature sufficient to have caused it to bend to the desired curvature and for it to become tempered upon quenching.

When the mold M and its supported glass sheet G is supported between the nozzles 48 and 148, the entire frame including the nozzles are reciprocated while cold air under pressure is imparted to the opposite surfaces of the curved glass sheet through the elongated nozzles. Elongated sheets of cold air impinge on the curved glass sheet surfaces from the air supplied through the parallel nozzles. Thus, the glass sheet G is immediately quenched and cooled. The relatively large escape passages 53 and 153 permit rapid removal of the air heated on contact with the glass to facilitate the flow of additional cold air against the curved glass.

There is a tendency for some of the air impinging on the central region of the glass to be entrapped by the reciprocating streams of air flowing onto the sheet in flanking relation to the streams impinging on the central portion. Thus, the central portion of glass sheets in excess of about 2 feet in width and about 5 feet in length had particles on fracture larger than permitted by the safety code of the American Standards Association when subjected to quenching from a single air source by prior art apparatus.

The present invention permits the employment of a single source of air under pressure to produce an adequate "break pattern" (particle size small enough to satisfy the code) by enlarging the width of the central portion only of the centrally disposed upper and lower nozzles 48 and 148 only, which are depicted by reference numbers 58 and 158. The central portions 59 and 159 of nozzles 58 and 158, respectively, are about 3/8 inch in width for a length extending about 14 inches on each side of the center. The remainder of the nozzles 58 and 158 are 1/4 inch wide, the same width as the entire length of nozzles 48 and 148.

Thus, from a single air supply source, the nozzle construction of the present invention furnishes a greater rate of air flow to the central region of the glass sheet than to the areas surrounding the central portion during quenching. This non-uniform air flow establishes a pressure gradient in the space occupied by the glass sheet being quenched, thus causing the air to be diverted outward along the entire surface of the glass. This outward diversion of air reduces the likelihood of establishing a centrally disposed area of stagnant air.

For a typical pattern wherein a volume of 365 cubic feet per minute was supplied per foot of length of slot nozzle to temper heat-softened glass sheets, the break pattern did not satisfy the American Safety Standards safety code before the central portion of the 2 center nozzles was widened. The same conditions were repeated after the central portion of the 2 center nozzles was widened for 14 inches on each side of the longitudinal center line. The break pattern of the tempered glass using the altered nozzles with all other conditions identical was acceptable throughout the entire area of the tempered sheets tested including the central area previously yielding particles too large to pass the code requirements.

Other alternative constructions of the nozzle structure for elongated slot nozzles are shown in FIGS. 5 and 6. In these alternative devices, the nozzle is widened to form a diamond-shaped orifice depicted as reference number 62 in FIG. 5, or an arcuate orifice 64, as in FIG. 6. The nozzle width is gradually widened either arcuately or in the shape of a diamond from 1/4 inch to 1/2 inch only for the special nozzles 58 and 158 disposed centrally of the upper and lower sets of slot nozzles 48 and 148. Such elongated slot nozzles are preferably separated from one another by 6 inches center to center as in the first embodiment.

While the construction of apparatus suitable for the present invention has been described for use in the reciprocating type of elongated slot nozzle oscillator, it is also useful in tempering apparatus employing nozzles of round cross section that are either reciprocated or moved in closed orbital paths that define substantially circular paths with respect to the opposing surfaces of the glass. For example, in the method described and claimed in U.S. Patent No. 3,008,272 to Lloyd V. Black and James D. Moorhead wherein nozzles are moved in substantially circular overlapping patterns with respect to the surface of the glass in closed orbital paths, the centrally disposed nozzles 66 may be made of larger diameter than the remaining circular nozzles 68. Such a novel construction is depicted in FIG. 7. A typical arrangement comprises nozzles 66 of 3/4 inch diameter in the central area, and nozzles 68 of 1/2 inch diameter in the area surrounding the central area. The nozzles are disposed in a checkerboard pattern with 2 1/2 inch spacing center to center along the squares of the pattern. All the nozzles are simultaneously moved in orbits of 3 5/8 inch diameter to cover the entire glass surfaces during quenching. Air is supplied at a rate of from about 15 to about 25 cubic feet per minute or more per nozzle depending on the size and the shape of the glass sheet undergoing quenching.

The central area occupied by the wider nozzles 66 depends upon the size and the shape of the glass sheets to be tempered. Generally, less than about 1/4 of the nozzles are made wider in the central area of the nozzle boxes in quenching apparatus for present-day commercial patterns.

The form of the invention as shown and described in this disclosure represents an illustrative preferred embodiment and certain modifications thereof. It is understood that various changes may be made without departing from the spirit of the invention as defined in the claimed subject matter which follows.

What is claimed is:

1. A nozzle box for tempering glass sheets comprising an apertured wall positioned to face a surface of a glass sheet supported in spaced relation to said wall for tempering, means for supplying fluid under pressure through the apertures of said apertured wall to quench the glass sheet, said wall having sufficiently larger apertures in its central portion than in the remainder of said wall surrounding its central portion to cause a slight pressure gradient in said fluid from the central region to the outermost regions of said space between said glass sheet and said wall, thus resulting in a continuous outward flow of said fluid from the center to the margin of the glass sheet.

2. A nozzle box as in claim 1, wherein said wall comprises a series of elongated, parallel nozzle openings arranged in spaced, side-by-side relation and including end nozzles and intermediate nozzles, the width of said nozzles being a maximum at the central portion of the intermediate nozzles.

3. In apparatus for tempering bent glass sheets comprising means for supporting a heated, bent glass sheet for tempering, a first set of elongated, parallel nozzles having curvilinear orifices conforming to the shape of said bent glass sheet disposed on one side of and facing a position occupied by said bent glass sheet to be tempered, a second set of elongated, parallel nozzles having curvilinear orifices conforming to those of said first set of nozzles disposed on the other side of and facing said position, a frame supporting said sets of nozzles in fixed spatial relation to one another, means to supply air under pressure through said nozzles, and means to reciprocate said frame and said nozzles along an axis transverse to the length of said nozzles, the improvement wherein the central portion of said nozzles disposed centrally of said sets is wider than their end portions and than the width of the nozzles disposed laterally outward of said central nozzles.

4. Apparatus for tempering glass sheets comprising a first air box having an apertured wall, a second air box having an apertured wall facing and spaced from said apertured wall of said first air box, means for supporting a heat-softened glass sheet between said apertured walls for tempering, means for moving said air boxes in unison, and means for supplying tempering fluid under pressure to said air boxes, said apertured walls having sufficiently larger apertures in their central portion than in the portions thereof surrounding said central portion to cause a slight pressure gradient in said fluid from the central region to the outermost regions of said spaces between said glass sheet and said walls, thus resulting in a continuous outward flow of said fluid from the center to the margin of the glass sheet.

References Cited by the Examiner

UNITED STATES PATENTS 2,525,112  10/1959  Baker _____ 64—114
3,125,430  3/1964  Richardson _____ 64—348 X

FOREIGN PATENTS 231,862  7/1944  Switzerland.

(Other references on following page)

References Cited by the Applicant

UNITED STATES PATENTS 3,186,815  6/1965  Jochim.

FOREIGN PATENTS 1,339,535  9/1963  France.
1,344,881  10/1963  France.
726,626  3/1955  Great Britain.
763,267  12/1956  Great Britain.

DONALL H. SYLVESTER, *Primary Examiner.*

S. LEON BASHORE, A. D. KELLOGG, *Examiners.*